No. 763,694. PATENTED JUNE 28, 1904.
H. B. ROBINSON.
HIGH PRESSURE VALVE.
APPLICATION FILED JULY 20, 1903.
NO MODEL. 2 SHEETS—SHEET 2.

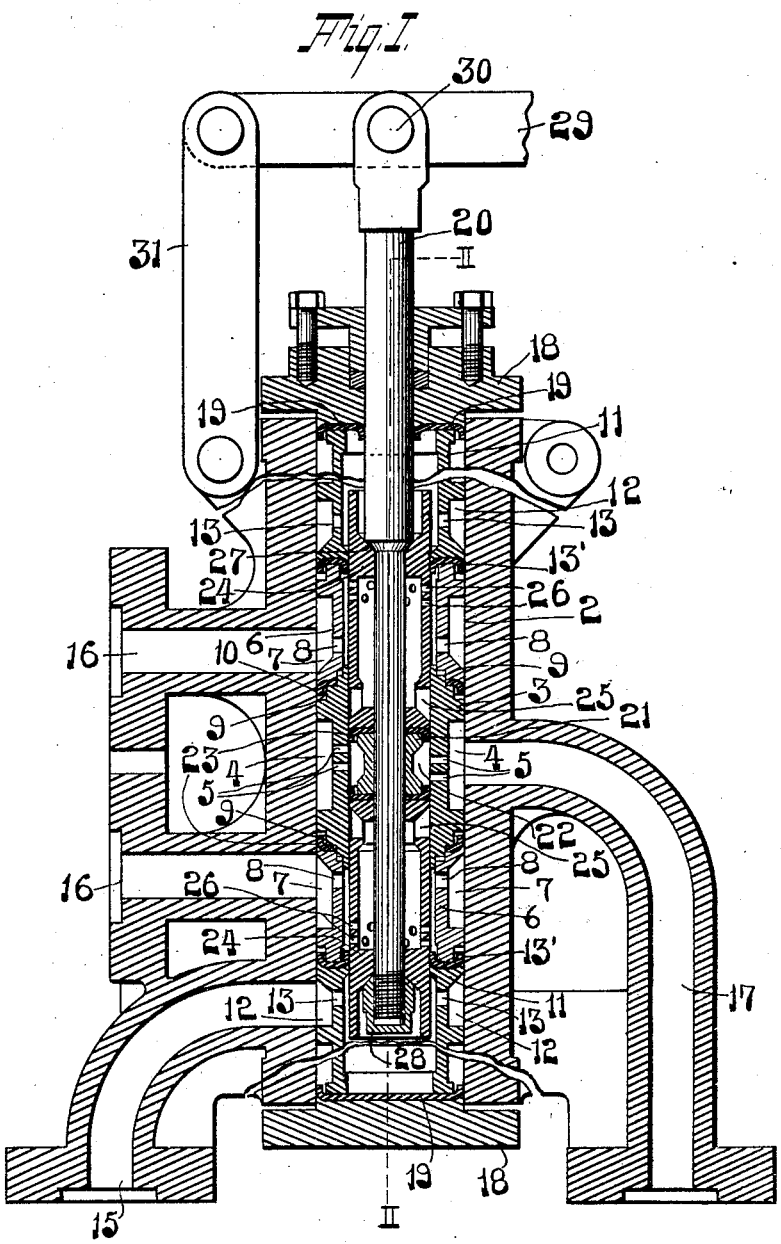

Fig. II.

WITNESSES: INVENTOR,
Geo. H. Harvey. Houghton B. Robinson,
F. N. Barber by his Attorney Wm. L. Pierce No. 763,694. Patented June 28, 1904.

UNITED STATES PATENT OFFICE.

HOUGHTON B. ROBINSON, OF PITTSBURG, PENNSYLVANIA, ASSIGNOR TO PITTSBURG VALVE, FOUNDRY AND CONSTRUCTION COMPANY, A CORPORATION OF PENNSYLVANIA.

HIGH-PRESSURE VALVE.

SPECIFICATION forming part of Letters Patent No. 763,694, dated June 28, 1904.

Application filed July 20, 1903. Serial No. 166,246. (No model.)

*To all whom it may concern:*

Be it known that I, HOUGHTON B. ROBINSON, a citizen of the United States, residing at Pittsburg, in the county of Allegheny and State of Pennsylvania, have invented or discovered new and useful Improvements in High-Pressure Valves, of which the following is a specification.

In the accompanying drawings, which make part of this specification, Figure I is a vertical section taken on the line I I of Fig. II, showing one form which my invention may assume. Fig. II is a section on the line II II of Fig. I.

My invention relates to high-pressure valves, such as are used for presses, elevators, and the like; and it is the object thereof to produce a valve which will not leak between the several parts thereof and will not need to have the packings changed as often as is required in the hydraulic valves now in common use.

Referring to the drawings, 1 represents the outer or main-valve casing provided with a longitudinal smooth opening 2, extending from end to end thereof. Fitting in the opening 2 are five tubular sections constituting a lining. The central section 3 is provided exteriorly with an annular supply-chamber 4 and has a number of ports 5 connecting the supply-chamber with the interior of the lining. At each end of the section 3 is an intermediate section 6, each having an exterior annular chamber 7 and several ports 8, leading from the chamber 7 to the interior of the lining. The ends of the section 3 have a series of shoulders 9 of different diameters, and the adjacent ends of the sections 6 have also a series of corresponding shoulders 10, the shoulders of larger diameters in one section lying opposite the shoulders of smaller diameters of the adjacent section. I have shown three opposing shoulders on the ends of the central section and the inner ends of the intermediate sections, and between the central pair of opposing shoulders I place a cup-packing 10', with its side or flange bearing against the interior wall of the casing 1 and extending toward the supply-chamber in order to prevent the passage of water behind the lining from said chamber. The inner shoulders 9 of the opposing sections do not touch, in order that the packing-rings may be clamped tightly, which could not be done if the said shoulders engaged before the rings were securely clamped. The space between the shoulders also permits a tightening of grip of the sections on the packing. The packing-cups extend from the interior wall of the casing to a circle intermediate of the interior and exterior walls of the lining and are separated from the interior of the lining by extensions of the section 3.

Opposite the outer end of each intermediate section 6 and occupying each end portion of the opening 2 is a section 11, provided with the annular chamber 12 and the exhaust-ports 13, leading from the chamber 12 to the interior of the lining.

The sections 6 and 11 clamp between their opposing ends channeled packing-rings 13', bearing on both the interior of the casing 1 and the exterior of the piston, the sides of the channels extending toward the chambers 7 to prevent leakage toward the ends of the casing.

The upper exhaust-chamber 12 is connected to the lower exhaust-chamber by the external passage 14, and the lower exhaust-chamber 12 is drained by the exhaust-passage 15, which extends through the casing 1 and has its inlet opposite the lower chamber 12. Each intermediate chamber 7 communicates with a passage 16, leading to some mechanical element to which the hydraulic pressure is applied to do work. The supply-chamber 4 is fed from the supply-passage 17, which has its outlet opposite the said chamber and lies between the two passages 16.

The ends of the casing 1 are closed by caps 18, which clamp the channeled packing-rings 19 between themselves and the outer ends of the sections 11, the sides of the channels extending toward the exhaust-chambers 12 to prevent water from leaking past the caps. Reciprocating through the upper cap 18 is the piston-rod 20, carrying the valve-piston, which is composed of a central section and two end sections. The central section 21 is spool-shaped, and when the piston is centrally disposed the annular channel 22 stands opposite the ports 5 and the supply-chamber 4. Cup-shaped packing-rings 23 are applied to each end of the section 21, with their sides extending toward each other, so that water cannot pass between the piston and the lining toward the ends of the casing. Against the outer faces of the packing-rings 23 are the cylindrical hollow piston-sections 24, having near their inner ends the large ports 25 and near their outer ends the small ports 26, leading radially from the inside of the sections to the outside thereof. The piston-rod 20 has a reduced lower end joined to the larger upper end by a ground-shoulder 27, which fits the ground-seat in the outer ends of the piston-section 24. The reduced portion of the piston-rod extends down through the said sections of the piston and its lower end is provided with a nut 28, which screws on the lower end of the piston-rod and has a ground upper end fitting a ground-seat in the lower end of the lower piston-section 24. The sections 24 extend a short distance beyond the ground-joints and the joints between the piston-sections and the piston-rod, in order that when the piston is at either extreme the piston-sections will not pass beyond the packing 13', as shown in Fig. II. The piston is operated by a lever 29, which is pivoted to the piston-rod at 30 and to the link 31, pivoted to the casing 1. When the valve-piston stands as shown in Fig. I, the water in the supply-passage 17 cannot pass into either passage 16 because the packing-rings stand between the chambers 4 and 7. The water in the passages 16 cannot pass into the exhaust-passages 14 or 15 because the packing-rings stand between the chambers 7 and 12 at each end of the casing 1. When the piston has been moved to its upper limit, as shown in Fig. II, the water in the supply-chamber 4 can pass through the ports 5 of the central section of the lining and the ports 25 at the upper end of the lower section 24 into the interior thereof. From the inside of the lower section 24 the water passes out through the ports 26 therein and through the ports 8 into the lower chamber 7 and thence into the lower passage 16. At the same time water in the upper passage 16 passes from the upper chamber 7 through the ports 8 of the upper section 6 of the lining and through the ports 25 of the upper piston-section 24 into the interior thereof. From the inside of the section 24 the water passes out through the ports 26 and 13 into the upper exhaust passage 12, whence it passes by way of external channel 14 into the lower exhaust-chamber 12 and out therefrom through the exhaust-passage 15. When the piston is moved to its lower limit, water is admitted to the upper passage 16 and exhausted from the lower passage 16, the course of water being obvious without further description.

By making the piston and lining in sections the parts can be cheaply replaced when worn or otherwise damaged and the parts are much more easily machined and fitted.

It will be understood that the fit of the sections of the lining and the casing is such that water can pass between them, so as expand the packings 10' and 13'.

Having described my invention, what I claim is—

1. In a hydraulic valve, a casing having a longitudinal unchambered opening, a lining therein composed of five separable and removable sections, the central section having a supply-chamber, the end sections each having an exhaust-chamber therein, and the intermediate sections each having a chamber, a supply-passage in communication with the supply-chamber, exhaust-passages in communication with the exhaust-chambers, pressure-passages in communication with the intermediate passages, and packing-rings between the ends of adjoining sections, in combination with a three-section piston, the end sections being cylindrical shells having ports at each end extending through the walls thereof, and packing-rings between the central section and each end section, the packing-rings between the central section of the lining and the adjacent section thereof being covered by a portion of the lining so as to be out of contact with the piston and the lining presenting an uninterrupted surface at the junction of said sections of the lining.

2. In a hydraulic valve, a casing having a longitudinal unchambered opening, a lining therein composed of five separable and removable sections, the central section having a supply-chamber, the end sections each having an exhaust-chamber therein, and the intermediate sections each having a chamber, a supply-passage in communication with the supply-chamber, exhaust-passages in communication with the exhaust-chambers, pressure-passages in communication with the intermediate passages, and packing-rings between the ends of adjoining sections, the packing-rings between the middle section and each adjacent section extending from the interior wall of the casing to a circle intermediate of the interior and exterior walls of the lining, in combination with a three-section piston, the end sections being cylinders having ports at each end extending through the walls thereof, and packing-rings between the central section and each end section, the packing-rings between the central section of the lining and the adjacent section thereof being covered by a portion of the lining so as to be out of contact with the piston and the lining presenting an uninterrupted surface at the junction of said sections of the lining.

3. In a hydraulic valve, a hollow casing having a central supply-passage, a pressure-transmitting passage on each side of the supply-passage, and an exhaust-passage beyond each pressure-transmitting passage, a valve-lining in the hollow of the casing having a central section opposite the supply-passage and between the pressure-transmitting passages, end sections opposite the exhaust-passages, and intermediate sections each spanning one of the pressure-transmitting passages, and packing-rings between the adjacent ends of the sections, in combination with a piston having two ported sections each a cylindrical shell, the arrangement being such that either piston-section may connect the supply-chamber with a pressure-transmitting chamber, while the other piston-section connects the remaining pressure-transmitting chamber with an exhaust-chamber, the packing-rings between the central section of the lining and the adjacent section thereof being covered by a portion of the lining so as to be out of contact with the piston and the lining presenting an uninterrupted surface at the junction of said sections of the lining.

Signed at Pittsburg, Pennsylvania, this 15th day of July, 1903.

HOUGHTON B. ROBINSON.

Witnesses:
F. N. BARBER,
M. A. BUSHMAN.